Sept. 6, 1938.  H. KLEIN  2,128,947
STARTING DEVICE FOR INTERNAL COMBUSTION ENGINES
Filed Oct. 25, 1935

Inventor
Hermann Klein
by Steward & McKay
his attorneys

Patented Sept. 6, 1938

2,128,947

UNITED STATES PATENT OFFICE 2,128,947

STARTING DEVICE FOR INTERNAL COMBUSTION ENGINES

Hermann Klein, Stuttgart-Feuerbach, Germany, assignor to Robert Bosch Gesellschaft mit beschrankter Haftung, Stuttgart, Germany Application October 25, 1935, Serial No. 46,821
In Germany November 19, 1934

11 Claims. (Cl. 123—179)

The invention relates to a starting device for internal combustion engines, in which a driving member, such as a pinion capable of being engaged at will with a part of the engine to be started, is connected by an automatically acting friction disc clutch to primary driving means which may include an energy storage means such as an inertia mass and wherein the clutch becomes operative by an axially displaceable pressure member. The invention consists in the feature that the pressure member, in the position of repose of the starter, is held away from the friction discs by a spring, the action of which, on the pressure member is annulled on the engagement of the driving member.

Figure 1:
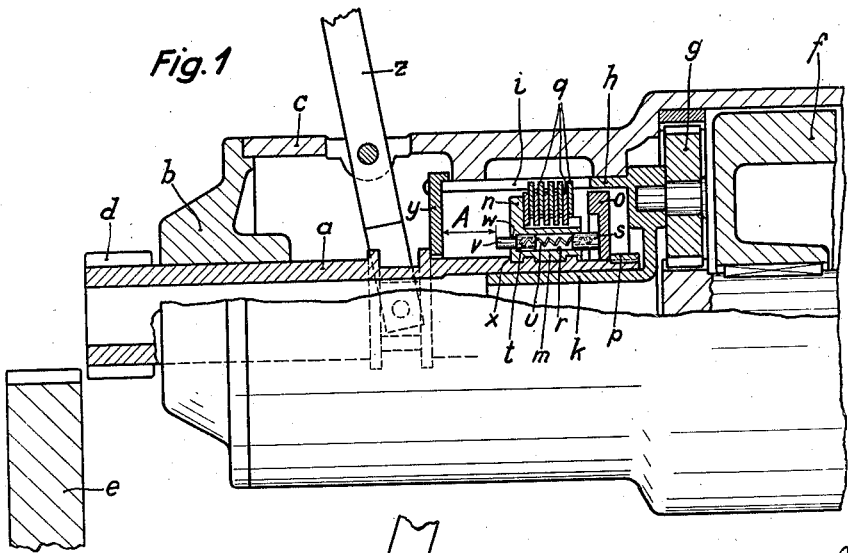
Figure 2:
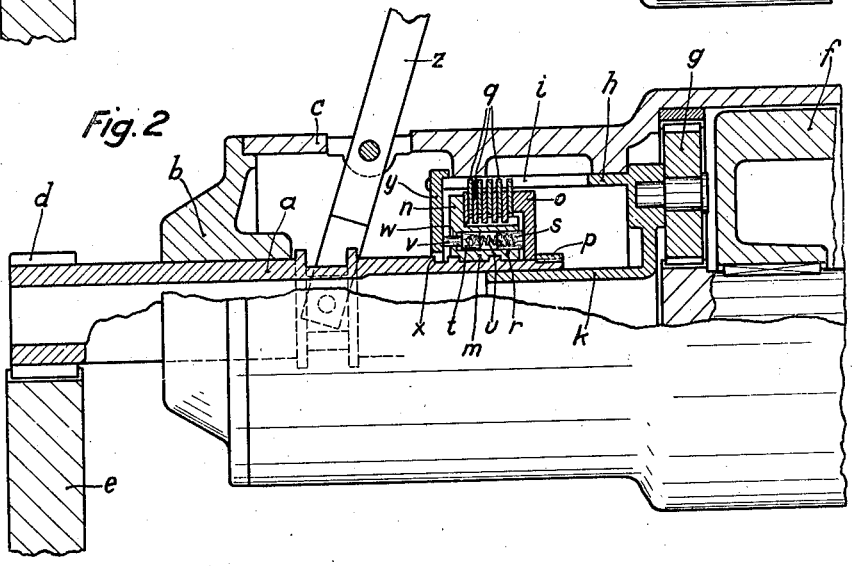

One form of construction of the present invention is shown in the accompanying drawing by way of example. In the drawing, Figure 1 is a sectional view of a starting device, whilst Figure 2 shows the device in the working position.

In the drawing $a$ denotes a hollow shaft, which is mounted in a bearing $b$ of a casing $c$ of the starting device, and is longitudinally displaceable therein. The end of the shaft projecting beyond the bearing is formed as a pinion $d$ which constitutes the driven member of the starting device. $e$ is the toothed rim of a flywheel of an internal combustion engine (not shown).

The hollow shaft is connected with the driving part of the starting device, which in the present case consists of an inertia mass $f$, a planet gearing $g$ and a cup $h$ by an automatic freewheel clutch $i$, which will be further described hereinafter. $k$ is a hub of the cup on which the inner end of the hollow shaft is mounted. The cup itself is revolubly mounted in the casing $c$.

The friction disc clutch consists of a control member or nut $m$ in threaded engagement with the shaft $a$ and having a flange $n$, a pressure plate $o$ which is adapted to bear against a collar $p$ of the hollow shaft, and a number of friction discs $q$, alternate discs of which are in engagement with the cup $h$ and intermediate discs are in engagement with the nut $m$. The nut $m$ has several longitudinal bores $r$, in each of which two bolts $s$ and $t$ are arranged so as to be longitudinally movable.

Between the bolts is a compression spring $u$. The bolt $s$ projects beyond the nut and bears against the pressure plate $o$. The bolt $t$ which bears in one end of the bore, has a pin $v$ which projects through an opening $w$ in that end of the bore and beyond the flanged end of the nut. On the hollow shaft is a stop $x$ against which the nut $m$ is pressed by the spring $u$ so long as the starter is in the position of repose. The distance of the stop from the collar $p$ on the hollow shaft is such that the distance between the flange $n$ of the nut and the pressure plate $o$, when the nut bears on the stop, is greater than the distance occupied by the friction discs. In the position of repose of the starter the free end of the clutch cup $h$ projects by the amount A beyond the pin $v$. At this end of the cup an inwardly projecting annular disc $y$ is mounted. $z$ is a lever for displacing the hollow shaft when putting the pinion into engagement.

The mode of working the apparatus is as follows:—

When the driver desires to start the motor by means of the starting device, he first brings the inertia mass $f$ to a high speed either manually or by means of an electric motor. The planet gearing and the clutch cup $h$ rotate together with the inertia mass. No energy is thereby transmitted to the hollow shaft, because the starting device is still in the position shown in Figure 1 and therefore the friction discs can still freely slide past each other.

The driver now displaces the hollow shaft by means of the lever $z$. In doing so, the pinion $d$ is put into engagement with the rim $e$ of the flywheel. At the same time the pressure plate $o$ is displaced by means of the collar $p$, and in its turn pushes before it the nut $m$ and also the friction discs by means of the bolts $s$, $t$, and the spring $u$. After a displacement equal to the amount A, the pin $v$ strikes against the annular disc $y$. By this time the pinion has already penetrated to a certain extent into the toothed rim of the flywheel. If the driver now moves the hollow shaft still further into the position shown in Figure 2, the bolt $t$ is driven into the nut against the pressure of the spring $u$ whereby the action of the spring on the nut $m$ is eliminated. At the same time, the nut is screwed towards the pressure plate so that the friction discs are pressed by the nut against the pressure plate and in consequence are now in a position to transmit the rotary motion of the cup $h$ to the nut and the hollow shaft. The nut $m$ at the same time exerts on the friction discs a pressure corresponding to the required torque.

As soon as the motor overtakes the starter, the nut screws itself away from the friction discs in which it is assisted by the compression spring $u$ and by the pins $v$ which are driven by the friction on the annular disc $y$. On the disengagement of the pinion, the nut $m$ is pressed by the spring u again towards the stop x of the hollow shaft, and thus restores the condition of the starting device to that shown in Figure 1.

I declare that what I claim is:

1. A starting device for internal combustion engines comprising an axially displaceable rotatable shaft, a driving member, adapted for connection with a part of the engine, carried by said shaft, a primary driving means, a friction clutch including a plurality of friction discs for interconnecting said driving member with said primary driving means, a pressure member carried by said shaft and carrying a number of said friction discs and initially displaceable with said shaft and driving member, a cup associated with said primary driving means and carrying the remainder of said friction discs, resilient means normally adapted to prevent inter-engaging relationship of said friction discs, means for effecting axial displacement of said pressure member and said driving member in unison to bring the latter into engagement with said engine part and operable to nullify the action of said resilient means and permit inter-engaging driving relationship of said friction discs after engagement of said driving member with said engine has been effected, and means for effecting further displacement of said pressure member alone.

2. A starting device for internal combustion engines comprising a driving member adapted for connection with a part of the engine, primary driving means, a cup in operative driving relationship with said primary driving means, friction discs carried by said cup, a shaft carrying said driving member and displaceable therewith, a pressure member axially displaceable with said shaft and threaded thereon, friction discs carried by said pressure member, resilient means normally adapted to prevent interengaging driving relationship between said friction discs of said cup and said friction discs of said pressure member, means for effecting axial displacement of said pressure member and said driving member in unison to bring the latter into engagement with said engine part and operable to nullify the action of said resilient means and permit inter-engaging driving relationship of said friction discs after engagement of said driving member with said engine has been effected, and means for effecting additional displacement of said pressure member.

3. A starting device for internal combustion engines comprising a shaft, a driving member on said shaft adapted for connection with a part of the engine, primary driving means, a cup in operative driving relationship with said primary driving means and extending co-axially of said shaft, friction discs carried by said cup, a pressure member in threaded engagement with said shaft for axial displacement therewith and relative angular displacement thereto, a friction disc carried by said pressure member, means for axially displacing said shaft, resilient means holding said friction discs of said cup and pressure member apart in one position of said shaft, pressure member and driving member, and means engaging said resilient means and nullifying the action thereof to allow frictional engagement of said discs when said shaft, driving member and pressure member are displaced to a position wherein said driving member is in engagement with said engine part and said pressure member has been angularly displaced about said shaft.

4. A starting device for internal combustion engines comprising a shaft, a driving member on said shaft adapted for connection with a part of the engine, primary driving means, a cup in operative driving relationship with said primary driving means and extending co-axially of said shaft, friction discs carried by said cup, a pressure member in threaded engagement with said shaft for axial displacement therewith and relative angular displacement thereto, a friction disc carried by said pressure member, means for axially displacing said shaft, a spring housed within said pressure member for preventing frictional engagement of said discs until said driving member on said shaft has been displaced into engagement with said part of the engine, and means engaging said spring for nullifying the action thereof upon axial displacement of said shaft.

5. A starting device for internal combustion engines comprising a shaft, a driving member on said shaft adapted for connection with a part of the engine, primary driving means, a cup in operative driving relationship with said primary driving means and extending co-axially of said shaft, friction discs carried by said cup, a pressure member in threaded engagement with said shaft for axial displacement therewith and relative angular displacement thereto, a friction disc carried by said pressure member, means for axially displacing said shaft, a spring housed within said pressure member, bolts at each end of said spring disposed within bores longitudinally formed in said pressure member, a stop on said cup located beyond one end of said pressure member and a stop on said shaft located beyond the other end of said pressure member, said bolts being engaged by said stops and drawn together within their bores to nullify the action of said spring and permit said friction discs to inter-engage with said driving member when said shaft is displaced into engagement with said engine part.

6. A starting device for internal combustion engines comprising a shaft, a driving member on said shaft adapted for connection with a part of the engine, primary driving means, a cup in operative driving relationship with said primary driving means and extending co-axially of said shaft, friction discs carried by said cup, a pressure member in threaded engagement with said shaft for axial displacement therewith and relative angular displacement thereto, a friction disc carried by said pressure member, means for axially displacing said shaft, a spring housed within said pressure member, a bolt at each end of said spring located within bores longitudinally disposed in said pressure member, a pin on one of said bolts projecting beyond one end of said pressure member, stop means on said cup in the path of displacement of said pin and stop means on said shaft for engagement with the other bolt whereby the bolts are brought together to compress the spring and nullify its effect to permit inter-engagement of said discs when said shaft is longitudinally displaced to bring said driving means into engagement with said engine part.

7. A starting device for internal combustion engines comprising a shaft, a driving member on said shaft adapted for connection with a part of the engine, primary driving means, a cup in operative driving relationship with said primary driving means and extending co-axially of said shaft, friction discs carried by said cup, a pressure member in threaded engagement with said shaft for axial displacement therewith and relative angular displacement thereto, a friction disc carried by said pressure member, means for axially displacing said shaft, a compression spring housed within said pressure member, bolts at the ends of said spring located in bores longitudinally disposed in said pressure member, a pin on one of said bolts projecting beyond one end of said pressure member, a stop on said cup which is disposed further away from said pin in its path of displacement and the distance between said driving means and said engine part when said starting means is inoperative and stop means on said shaft at the other end of said pressure member, said stop means displacing said bolts to compress said spring to nullify its effect on displacement of said driving member into engagement with said engine part and thus permit inter-engagement of said friction discs.

8. A starting device for internal combustion engines comprising a shaft, a driving member on said shaft adapted for connection with a part of the engine, primary driving means, a cup in operative driving relationship with said primary driving means and extending co-axially of said shaft, friction discs carried by said cup, a pressure member in threaded engagement with said shaft for axial displacement therewith and relative angular displacement thereto, a friction disc carried by said pressure member, means for axially displacing said shaft, a compression spring housed within said pressure member, bolts at the ends of said spring located in bores longitudinally disposed in said pressure member, a pin on one of said bolts projecting beyond one end of said pressure member, a stop on said cup which is disposed further away from said pin in its path of displacement and the distance between said driving means and said engine part when said starting means is inoperative and stop means on said shaft at the other end of said pressure member, further stop means on said shaft to cause angular displacement of said pressure member about said shaft after a predetermined longitudinal displacement of said pressure member and said shaft in unison.

9. Starting apparatus for internal combustion engines comprising a rotatable shaft mounted for longitudinal and rotary movements, a pinion secured against movement on said shaft and adapted to engage a member of the engine to be started, a control member mounted on said shaft for longitudinal movement thereof and rotary movement therewith, driving means, friction clutch means between said driving means and said control member, said control member operable to cause engagement of said clutch means, resilient means housed within said control member and projecting therefrom to prevent driving engagement of said clutch means until after engagement of said pinion with the engine, and means operable to nullify the action of said resilient means and permit driving engagement of said clutch means after engagement of said pinion with said engine.

10. Starting apparatus for internal combustion engines comprising a rotatable shaft mounted for longitudinal and rotary movements, a pinion secured against movement on said shaft and adapted to engage a member of the engine to be started, manual means for longitudinally moving said shaft and pinion to cause said pinion to engage said engine, a control member mounted on said shaft for longitudinal movement thereof and rotary movement therewith, rotatable driving means, friction clutch means between said driving means and said control member, said control member operable to cause engagement of said clutch means, resilient means housed within said control member and projecting therefrom to prevent driving engagement of said clutch means until after engagement of said pinion with the engine, and means operable to nullify the action of said resilient means and permit driving engagement of said clutch means after engagement of said pinion with said engine.

11. A starting device for internal combustion engines comprising a driving member adapted for connection with a part of the engine, primary driving means, a friction clutch for connecting said driving member with said primary driving means, a threaded pressure member axially displaceable with said driving member, resilient means housed within said pressure member projecting beyond the pressure member on both sides to prevent inter-engaging driving relationship of said friction clutch, and means to nullify the action of said resilient means upon axial displacement of said driving member.

HERMANN KLEIN.